United States Patent
Buxton (12)

(10) Patent No.: US 11,850,876 B1
(45) Date of Patent: Dec. 26, 2023

(54) MOTOR-VEHICLE SOFT BUG SCREEN PRODUCTS AND PRODUCTION

(71) Applicant: Jesse J. Buxton, Marshfield, MO (US)

(72) Inventor: Jesse J. Buxton, Marshfield, MO (US)

( * ) Notice: Subject to any disclaimer, the term of this patent is extended or adjusted under 35 U.S.C. 154(b) by 92 days.

(21) Appl. No.: 17/307,259

(22) Filed: May 4, 2021

Related U.S. Application Data

(60) Provisional application No. 63/019,549, filed on May 4, 2020.

(51) Int. Cl.
*B41M 5/00* (2006.01)
*B60R 19/52* (2006.01)

(52) U.S. Cl.
CPC ........ *B41M 5/0082* (2013.01); *B41M 5/0023* (2013.01); *B41M 5/0041* (2013.01); *B60R 19/52* (2013.01)

(58) Field of Classification Search
CPC .......... A42B 5/00; A63H 33/008; B41M 1/26; B41M 1/30; B41M 3/00; B41M 5/0047; B41M 5/0064; E06B 9/24; G09F 21/048; B32B 27/12; B32B 5/024; B60J 1/2005; B60J 11/06; D03D 1/0047
See application file for complete search history.

(56) References Cited

U.S. PATENT DOCUMENTS

| | | | | |
|---|---|---|---|---|
| 243,962 A * | 7/1881 | Palmer | ..................... | B32B 27/12 428/196 |
| 2,054,538 A | 9/1936 | Graves et al. | ......... | B60K 11/04 |
| 3,987,863 A | 10/1976 | Mittendorf et al. | ... | B60J 1/2005 |
| 4,085,964 A | 4/1978 | Hutto et al. | ........... | B60J 1/2005 |
| 4,547,406 A * | 10/1985 | Armstrong | .............. | B41F 15/20 248/362 |
| 5,518,803 A * | 5/1996 | Thomas | .................... | B44D 2/00 427/288 |
| 5,785,792 A * | 7/1998 | Locke | ....................... | E06B 9/24 156/247 |
| 5,830,529 A * | 11/1998 | Ross | ......................... | B44F 1/10 427/152 |
| 5,878,516 A | 3/1999 | Amairian | ................. | G09F 21/04 |
| 6,409,332 B1 * | 6/2002 | Yraceburu | ............. | B41J 11/007 271/197 |
| 6,830,119 B2 | 12/2004 | Whitworth | .............. | B60R 19/52 |
| 6,854,545 B1 | 2/2005 | Elwell et al. | .......... | B60K 11/04 |
| 9,193,202 B2 * | 11/2015 | Garcia | ................. | B41M 5/0047 |

(Continued)

*Primary Examiner* — John Zimmermann
(74) *Attorney, Agent, or Firm* — Jonathan A. Bay

(57) ABSTRACT

Soft bug screens for shielding motor vehicle radiators are disclosed. Mesh material having an un-lined surface and a surface with release liner is selected. The mesh material is fed out as uncut sheet from a wide roll, which is conveyed through a wide format printer with the release liner crossing the "waste ink collector" and the un-lined broad surface transiting the ink-application system. A light vacuum suction is supplied to the release-liner lined surface, to smooth the sheet flat without suctioning the sheet down to a pinned down immobility. Ink is applied on the transiting-past unlined broad surface of the mesh material while continuing to supply the light vacuum. The ink is let or heated to dry on the continuing transiting unlined broad surface along while still continuing supply of the light vacuum. The final outline is trimmed out. The release liner is peeled off.

3 Claims, 26 Drawing Sheets
(26 of 26 Drawing Sheet(s) Filed in Color)

(56) References Cited

U.S. PATENT DOCUMENTS

| | | | |
|---|---|---|---|
| 9,475,436 B2 | 10/2016 | Witkop | B60R 13/0838 |
| 2005/0029028 A1 | 2/2005 | Steinmacher | B60K 11/04 |
| 2005/0106990 A1* | 5/2005 | Field | A63H 33/008 |
| | | | 446/220 |
| 2010/0031423 A1* | 2/2010 | Cincotti | A42B 5/00 |
| | | | 2/207 |
| 2012/0073767 A1 | 3/2012 | Graziano | E06B 9/54 |
| 2020/0223173 A1* | 7/2020 | Chen | E04H 15/54 |

\* cited by examiner

MOTOR-VEHICLE SOFT BUG SCREEN PRODUCTS AND PRODUCTION

CROSS-REFERENCE TO RELATED APPLICATION(S)

This application claims the benefit of U.S. Provisional Application No. 63/019,549, filed May 4, 2020. The foregoing patent disclosure(s) is(are) incorporated herein by this reference thereto.

BACKGROUND AND SUMMARY OF THE INVENTION

The invention relates to soft bug screens for shielding motor vehicle radiators from bug collisions and, soft bug screen products and production relative to affixing graphics.

A number of additional features and objects will be apparent in connection with the following discussion of the preferred embodiments and examples with reference to the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, wherein,

I. INTRODUCTION: THE LESSER PREFERRED EMBODIMENT

Figure 1:

FIG. 1 shows a motor-vehicle soft bug screen in accordance with a prototype during a development phase for the subject matter hereof, which development phase led to a more preferred embodiment in accordance with the invention.

Figure 2:

FIG. 2 shows a copy of the motor-vehicle soft bug screen that is shown in FIG. 1 (ie., these both being a lesser-preferred embodiment derived early during the development phase), but this FIG. 2 copy is installed on a different semi-truck.

Figure 3:
Figure 4:

FIGS. 1 and 2 show two versions of the same prototype soft bug screen to show a mint new condition, as for comparison with FIGS. 3 and 4 next. For both FIGS. 1 and 2, the substrate material used therein is referred to as extruded coated yarn (ECY), as better shown in FIG. 10. The ECY has a definite weave construction to it (very likely produced by a warp and weft frame or loom process). The surface is far from planar, as each longitudinal thread climbs over then dives under each successive lateral thread, and vice versa. Hence the surface has a regular pattern of high spots and low spots, and the low spots are further defined by low inside corners flanking each high spot.

It is an object of the invention to affix graphics to soft bug screens with wide-format printers. The class of "wide-format printers" encompasses several different printing technologies, only one of which will be discussed at length here. One is wide format printers using latex-based inks. Others include without limitation so-called solvent-based inks (albeit the solvent is a petroleum based solvent), or UV techniques, and so on.

Most of those technologies are inapplicable to the substrate material for soft bug screens, except latex-based inks and solvent-based inks.

And indeed, applicant was warned during his purchasing investigations that even those two printing technologies were not designed for his chosen substrate. He definitely received a warning in the style of "use at your own peril." And these printers are expensive. They start at just below six figures and go up from there. Modest models cost as much as a modest home.

Applicant prefers latex-based ink technology over solvent-based inks in consideration of workers and the working conditions for them. With latex-based inks, the ink/polymer solute is carried in a water base. The "solvent" based inks are carried in a petroleum product solvent, the drying/curing of which requires ample ventilation of fumes of hard-to-get straight answers on what risk the fumes pose as regards levels of annoyance to noxiousness.

So FIGS. 1 and 2 show a first undesirable effect, which can be seen once the product is installed. Although both bug screens are brand new, chrome features behind the bug screen can be readily made out. Those chrome features shine through the bug screen. In FIG. 1, these chrome features comprise seven vertical bars, and in FIG. 2, three such vertical bars (even at night).

FIGS. 3 and 4 show how two other copies of the soft bug screens of FIGS. 1 and 2 fared after three weeks of travel mainly confined to North and South Dakota (these copies in FIGS. 3 and 4 are not the same as in FIGS. 1 and 2 but all were installed and tested at more or less the same time). It is estimated that the semi-trucks traveled between 5,000 and 6,000 miles apiece (which is actually typical for a semi-truck that logs 100,000 miles annually on average).

FIGS. 3 and 4 show a further undesirable trait. The latex-based ink doesn't hold well to the extruded coated yarn (ECY) substrate.

The FIG. 3 bug screen looks much more faded than the FIG. 4 bug screen, even though both were tested for about the same length of time and over about the same mileage, probably due to cleaning. It appears the semi-truck in FIG. 3 travels in a dustier environment, and although the semi-truck is dirty here, cleaning due to power washing would literally wash away the graphics as well.

Figure 5:

FIG. 5 shows another bug screen prototype with extruded coated yarn (ECY) as the substrate, and shows further undesirable characteristics. The colors aren't vivid. The colors aren't even. This bug screen was never driven.

Even further undesirable factors relate to printing operations upon the extruded coated yarn (ECY) material. The uneven surface of the material picks up the ink in uneven proportions. Moreover, the lattice openings of the material allow a lot of waste ink to pass through. These wide format printers have component known as a "waste ink collector." It could also be called a tray or an elongate tank. The problem here with the extruded coated yarn (ECY) material is that, so much waste ink passes through, that the "waste ink collector" is effectively filled (and this is referred to as "saturated") after about twenty-five bug screen printings. At that time, the "waste ink collector" has to be replaced (not merely emptied), and these cost $500.00 a piece. So the issues with the "waste ink collector" are an ongoing troubling cost of doing business with the extruded coated yarn (ECY) material.

II. VISUAL CONTRASTS BETWEEN: THE LESS PREFERRED EMBODIMENT AND THE MORE PREFERRED EMBODIMENT

Figure 6:

A. FIG. 6 provides a visual contrast to FIG. 7.

FIG. 6 shows a soft bug screen made in accordance with the less preferred embodiment (eg., ~FIGS. 1-5 supra), characterized by among other factors using extruded coated yarn (ECY) material as the substrate.

Figure 7:

FIG. 7 shows a soft bug screen made in accordance with a more preferred embodiment in accordance with the invention, characterized by AMONG MANY OTHER FACTORS (which will be more particularly described below) using a vinyl coated mesh (VCM) material as substrate.

In FIG. 6, the sole color is supposed to be black, but is charcoal gray instead. In FIG. 7, the sole color is black again and is as dark as intended.

Figure 8:

B. FIG. 8 provides a visual contrast to FIG. 9.

FIG. 8 shows a soft bug screen made in accordance with the less preferred embodiment (eg., ~FIGS. 1-6 supra), characterized by among other factors using extruded coated yarn (ECY) material as the substrate.

Figure 9:

FIG. 9 shows a soft bug screen made in accordance with the more preferred embodiment in accordance with the invention, characterized by (among many other factors) using a vinyl coated mesh (VCM) material as substrate.

In FIG. 8, the colors are paler, and reflections off the grille ornament of the vehicle maker (CHEVROLET®) shine through.

In FIG. 9, the colors are more vivid, and it is believed that reflections off the grille ornament as not as bright.

III. VISUAL CONTRASTS AGAIN: EXTRUDED COATED YARN (ECY) AND VINYL COATED MESH (VCM)

Figure 10:
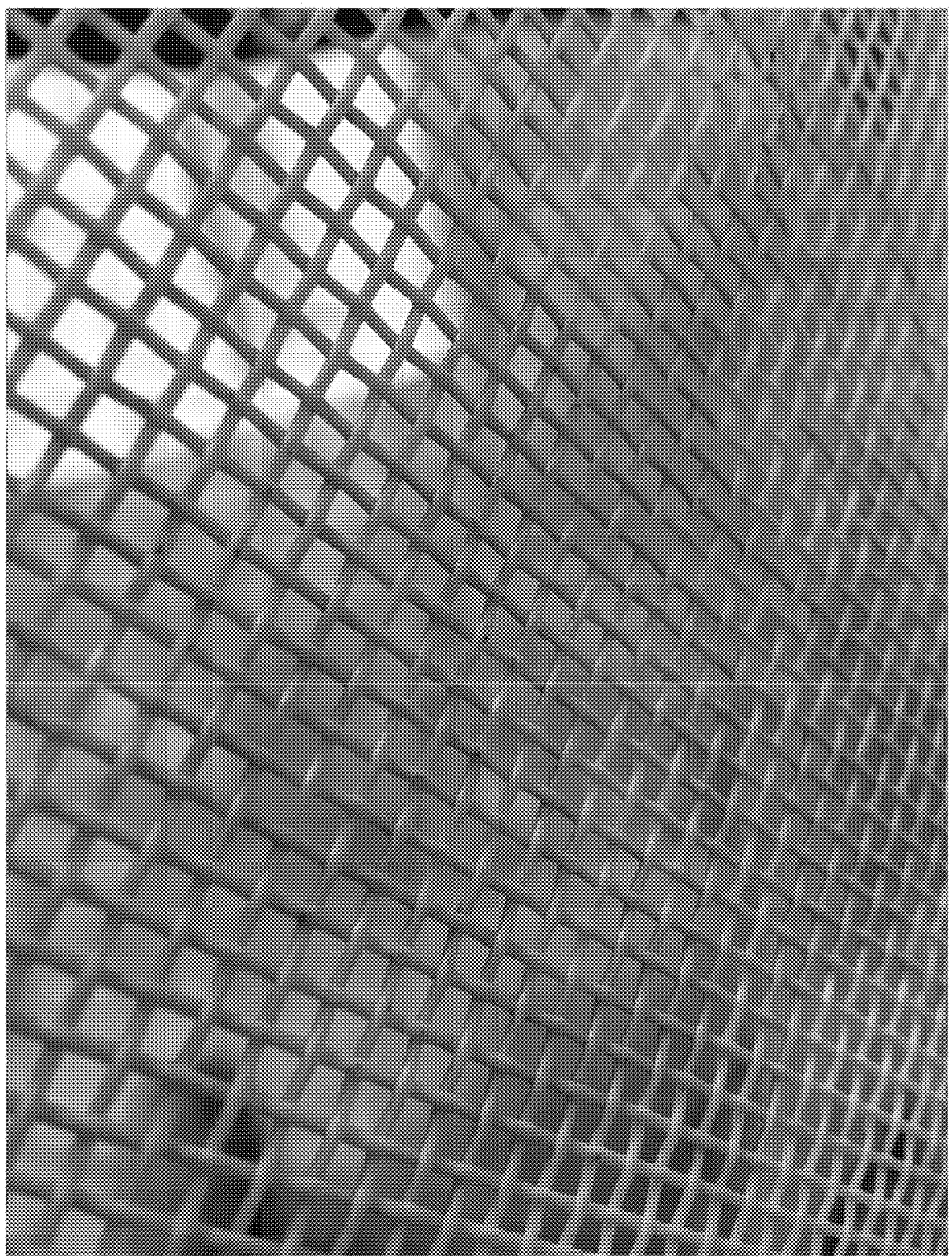

FIG. 10 shows extruded coated yarn (ECY) material from an up-close perspective. What FIG. 10 shows has been described in part above in connection with the description of FIGS. 1 and 2.

Figure 11:
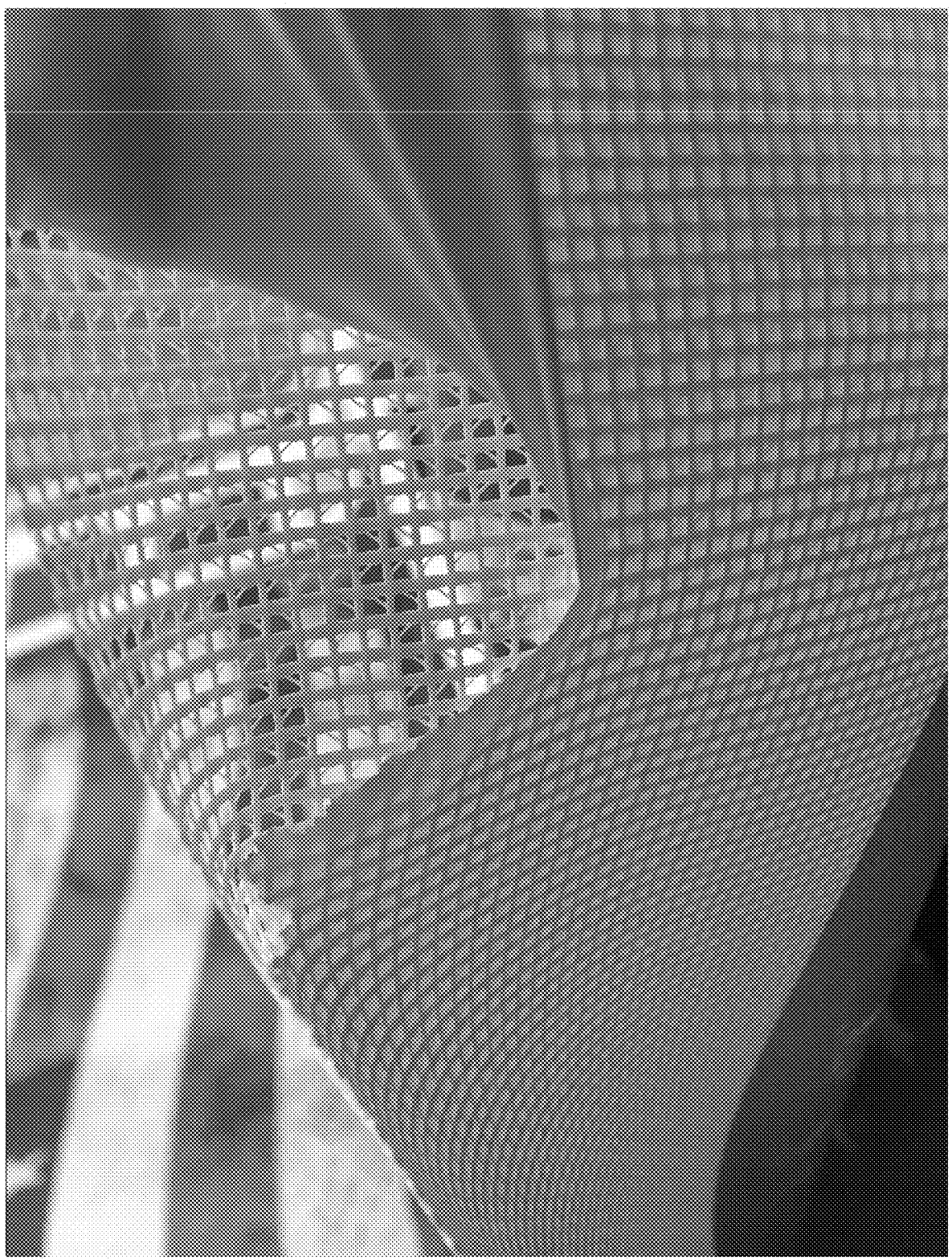

FIG. 11 shows vinyl coated mesh (VCM) material from an up-close perspective, and as revealed by the partial peeling away of a release liner.

Other than this paragraph, the respective names and acronyms for these two different materials will be followed in the rest of this description. At what first might seem confusing, both of these materials are "meshes" and both can be made from a base of polyester yarn and a coating of polyvinyl chloride:—in other words, they can be made of the same starter materials. So far what has been so far referred to as extruded coated yarn (ECY) may be alternatively referred to in lengthier terms as extruded coated polyester yarn mesh. Likewise, so far what has been so far referred to as vinyl coated mesh (VCM) may be alternatively referred to in lengthier terms as vinyl coated polyester yarn mesh. It is believed that other polymer threads might be used in conjunction with polyester to produce the base yarn, or maybe even in complete substitution. The polyvinyl chloride might likewise be blended with other compounds (eg., compounds increasing UV resistance or the like). But the two materials shown in FIGS. 10 and 11 can be made of the same starter materials. As said, what distinguishes them is when the weaving takes place. With extruded coated yarn (ECY), the yarn is coated and then the coated yarn is woven. With vinyl coated mesh (VCM), the process takes place in the opposite order. The uncoated yarn is woven, and then uncoated mesh is coated.

Hence vinyl coated mesh (VCM) can be much flatter on both surfaces. Of course this depends on quality of manufacture, but vinyl coated mesh (VCM) can have both surfaces very level. The vinyl coated mesh (VCM) is high quality and the hole sizes are very square and very regular. The longitudinal and lateral lattice courses are very straight and perpendicular to each other.

The mesh is quantified not only by materials and methods of production, but also by aperture pattern and Denier number ("D," and is the linear mass density of fibers). Denier is the mass in grams of nine-thousand meters (nine kilometers) of the fiber.

Applicant has the vinyl coated mesh (VCM) custom made for applicant, and it is 1000D 9×9. The 9×9 unit is in inches, and translates to nine holes in a longitudinal dimension by nine holes in a lateral dimension: eighty-one holes in a square inch, and here in a face-centered packing pattern.

Applicant prints on the FIG. 11 vinyl coated mesh (VCM) with the release liner fully attached. The vinyl coated mesh (VCM) material is provided stock as uncut sheets in a wide roll. The sheet is conveyed through the wide format printer with the release liner transiting across the "waste ink collector" and the un-lined side transiting past the ink-application system. Whether there is any more or less waste ink generated is not particularly known. But a whole lot less finds its way into the "waste ink collector."

The release liner furthermore allows vacuum systems to suction the sheet flat (without applying too much suction power and thus holding the sheet immobile) which in turn allows crisper graphics and flatter finished product after the heat drying process.

Once dry, the product can be trimmed to final outline. The release liner can be peeled off anytime after the graphics are dry.

IV. FIGS. 12 THROUGH 20

Figure 12:
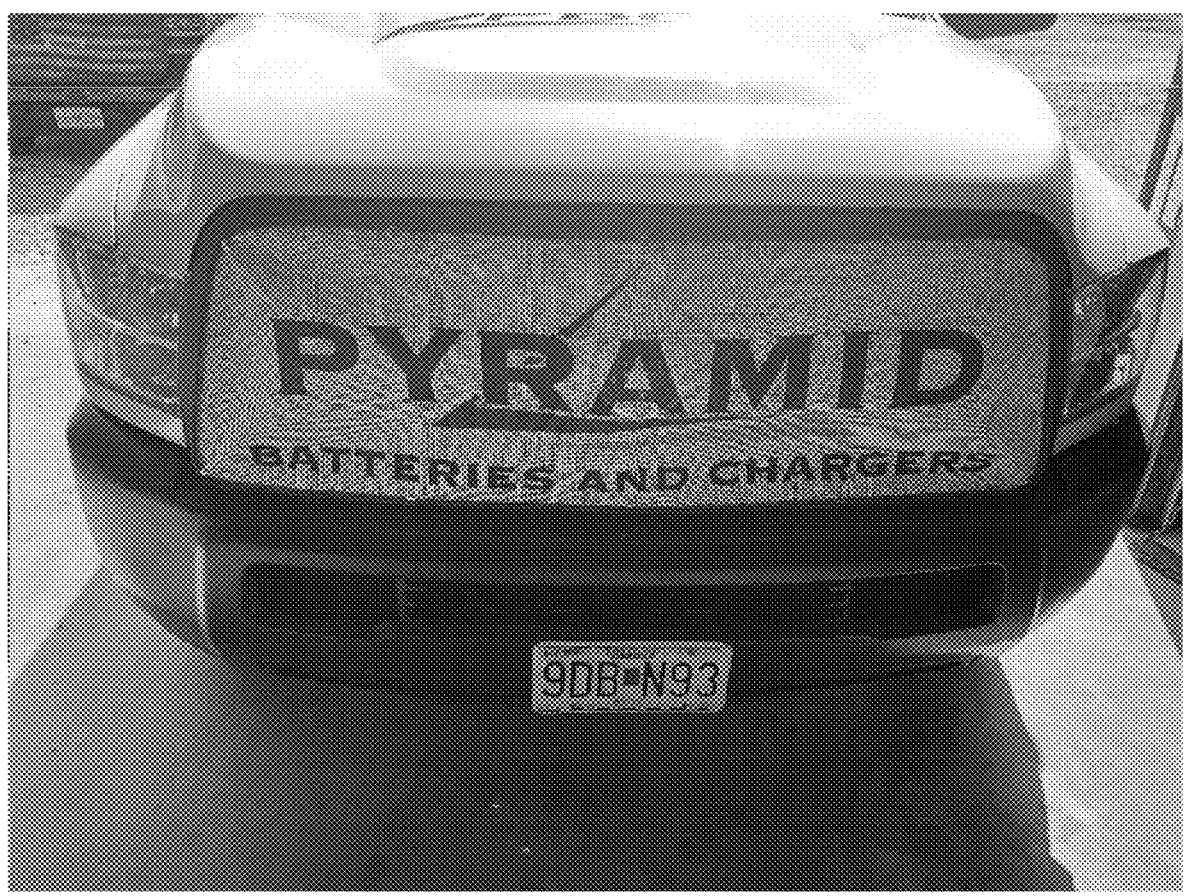

FIG. 12 shows another example of a soft bug screen product in accordance with the invention made by the preferred production materials and methods in accordance with the invention. FIG. 12 shows the soft bug screen product in accordance with the invention installed on the front of a motor vehicle and shielding the radiator (and the grille for that matter, as well as any other heat exchangers like transmission fluid cooler or air conditioning condenser) from bug contamination.

Figure 13:

FIG. 13 is a front elevation view like FIG. 12 except from a slight closer-in stand-point.

Figure 14:

FIG. 14 is a left side perspective view of FIG. 13.

Figure 15:

FIG. 15 is a perspective view comparable to FIG. 14 except showing the upper near-side (vehicle starboard side) corner partly unsnapped and hanging folded down.

Figure 16:
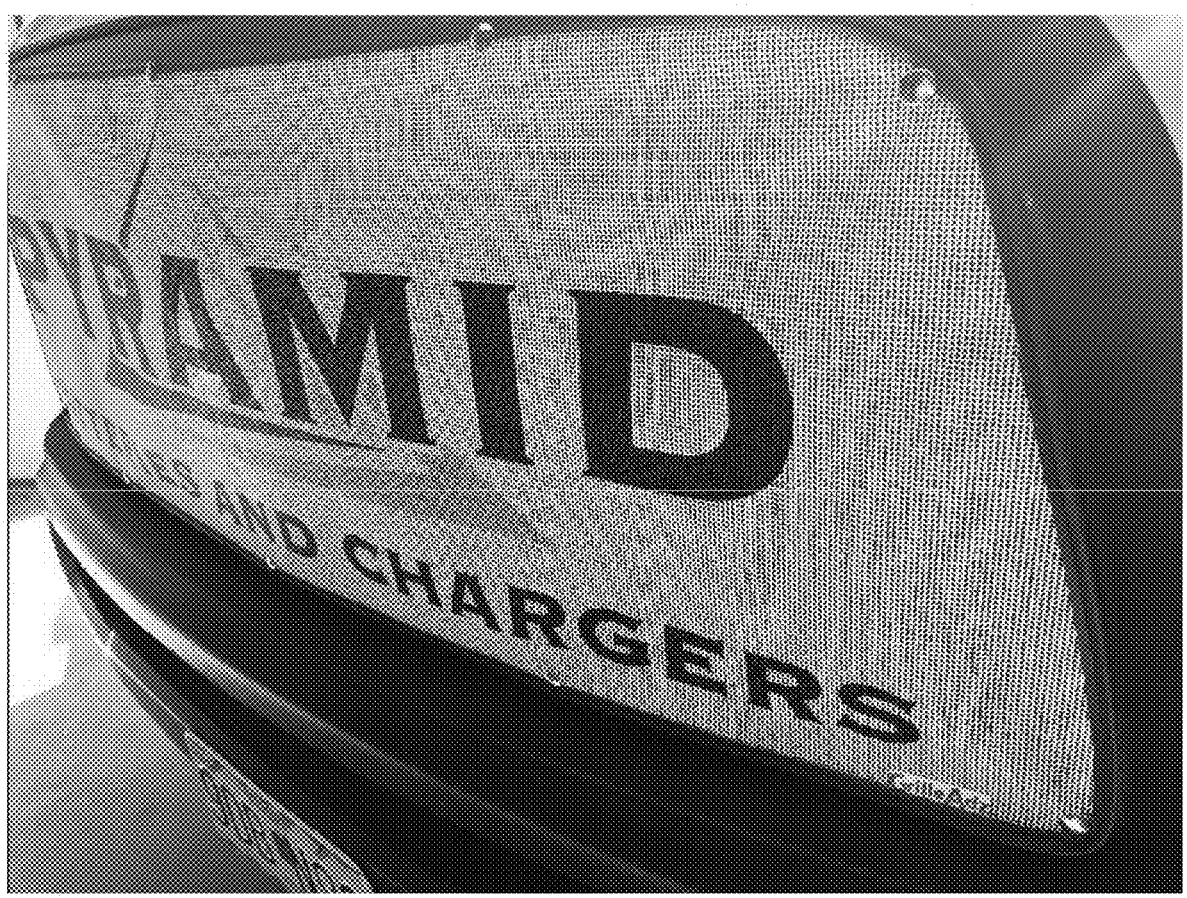

FIG. 16 is a right side perspective view of FIG. 13.

Figure 17:

FIG. 17 is a perspective view comparable to FIG. 16 except showing detail of lower near-side (vehicle port side) corner from a close-in stand-point.

Figure 18:

FIG. 18 is an in-close perspective view of the snap in the upper corner of the vehicle starboard side of the bug screen in an unsnapped state.

Figure 19:
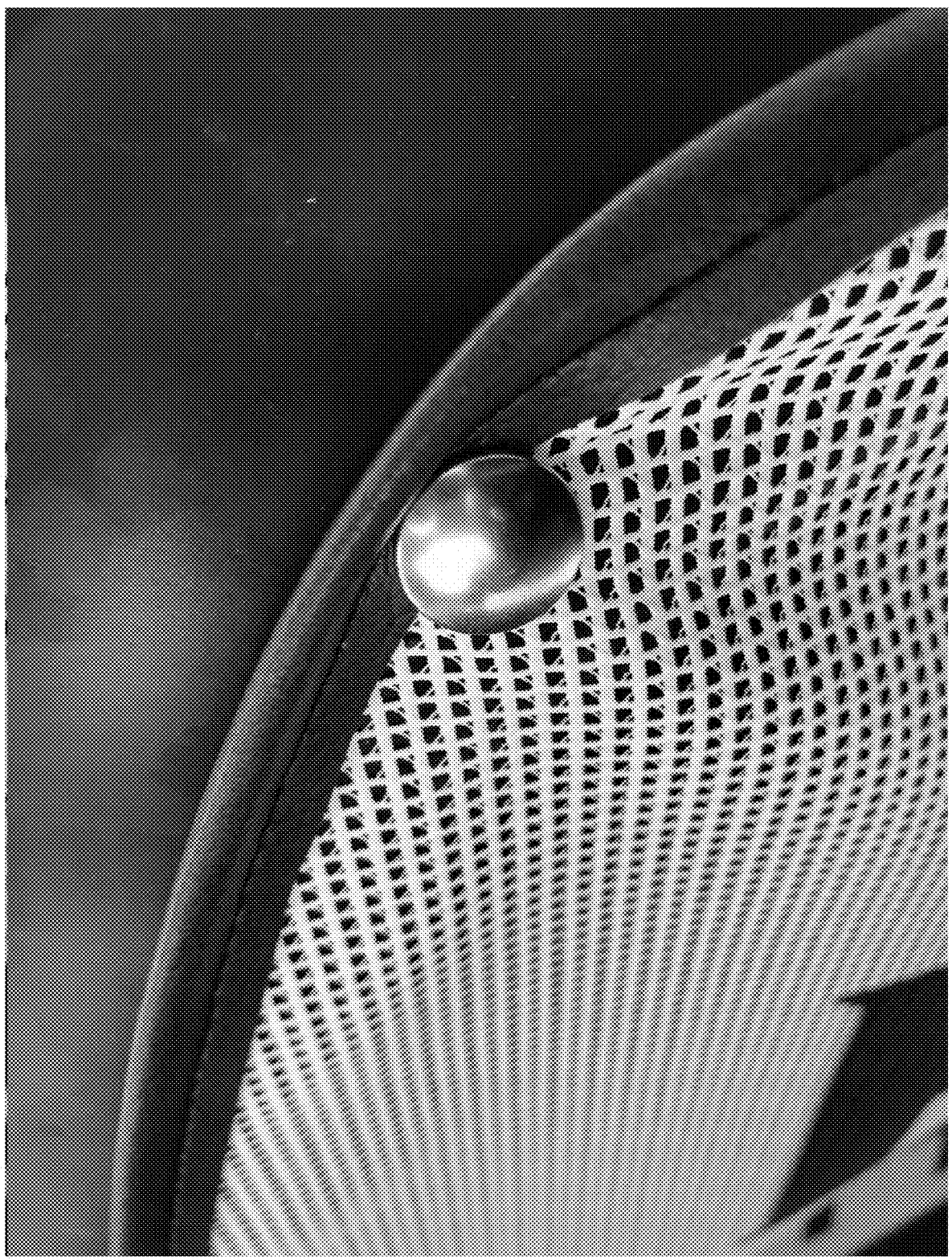

FIG. 19 shows the snap snapped.

Figure 20:

FIG. 20 is a perspective view comparable to FIG. 19 except from a slightly further away stand point.

V. FIGS. 21 THROUGH 26

Figure 21:

FIG. 21 shows an additional example of a soft bug screen product in accordance with the invention made by the preferred production materials and methods in accordance with the invention. FIG. 12 shows the soft bug screen product in accordance with the invention installed on the front of a motor vehicle and shielding the radiator (the grille, the transmission fluid cooler, air conditioning condenser and so on) from bug contamination.

Figure 22:

FIG. 22 is an in-close perspective view showing the vehicle starboard side upper corner unsnapped and hanging folded down.

Figure 23:

FIG. 23 shows the soft bug screen of FIG. 21 detached, lying on a ground and folded partly in half to show both the graphics side in part and the back side in other part.

Figure 24:

FIG. 24 is comparable to FIG. 23 except showing only the back side.

Figure 25:

FIG. 25 is comparable to FIG. 24 except showing only the graphics side.

Figure 26:

FIG. 26 is a close up detail of the vehicle port side edge of the soft bug screen of FIG. 25. It can be seen how the horizontal borders of the letter "z" (which is being viewed on its side) neatly follow and stay true on the horizontal ribs of the mesh.

That is, the vertical stringers and horizontal ribs of the mesh are neatly straight and true. Likewise, vertical and horizontal courses of the graphics likewise are straight and true.

DETAILED DESCRIPTION OF THE PREFERRED EMBODIMENTS

FIGS. 1 through 26 show various aspect and objections concerning MOTOR-VEHICLE SOFT BUG SCREEN PRODUCTS AND PRODUCTION in accordance with the invention.

It is an object of the invention to affix graphics to soft bug screens with wide-format printers. The class of "wide-format printers" encompasses several different printing technologies, only one of which will be discussed at length here. One is wide format printers using latex-based inks. Others include without limitation so-called solvent-based inks (albeit the solvent is typically a petroleum based solvent or other organic solvent), or UV techniques, and so on.

Most of those technologies are inapplicable to the substrate material for soft bug screens, except latex-based inks and possibly solvent-based inks.

And indeed, applicant was warned during his purchasing investigations that even those two printing technologies were not designed for his chosen substrate. He definitely received a warning in the style of "use at your own peril." And these printers are expensive. These printers start at just below six figures and go up from there. Modest models cost as much as a modest home.

Applicant prefers latex-based ink technology over solvent-based inks in consideration of workers and the working conditions for them. With latex-based inks, the ink/polymer solute is carried in a water base. The "solvent" based inks are carried in a petroleum product or other organic compound solvent, and the drying/curing of which requires ample ventilation of fumes of hard-to-get straight answers on what risk the fumes pose as regards levels of annoyance to noxiousness.

Again, when making inquiries about acquiring a latex wide format printer and for what use, Applicant was advised by multiple companies to not run unapproved substrates through the machine or else that would void the warranty if there would be resultant damage to the printer.

With that advisement in tow, Applicant had no guidance, no resources other than his own resourcefulness in experimentation, with variables to account for such as media thickness (ie., in order to prevent printer head strikes), and heat tolerance of the substrate as it went through the instant curing process (ie., in order to prevent warping and/or curling).

The industry standard for mesh bug screens installed on motor vehicle front grilles is no less than a 9×9 mesh (9 holes by 9 holes per share inch). Material with any tighter hole placement (eg., 12×12) will cause engine overheating which in turn causes impeller and/or thermostat failure, even catastrophic engine failure. Knowing all the impediments, Applicant went ahead with a careful experimentation program with the wide format latex printer, its settings and adjustments, as well as with a variety of candidate mesh materials.

Among such impediments to overcome, there was a great risk printer head strikes. The printer uses a vacuum system to keep the substrate flat and smooth on the print bed. Note that, the substrate here will be the mesh that is incorporated in the finished bug screen product in accordance with the invention. With only a few millimeters of clearance between the traveling print head and the substrate, there is little room for error as any pucker in the substrate material results in a head strike with the potential to damage a $135.00 print head. Another problem is ink visibility. When applicant spray painted mesh screens, the spray paint would "wrap around" the extruded coated yarn (ECY) material and create a vibrant colored image. However, the latex printer would put down just enough ink to coat the crests of the extruded coated yarn (ECY) material, and no deeper. This left the image on extruded coated yarn (ECY) material with dull colors, and if installed on a chrome grille surround, the image would be backlit by the reflecting chrome grille surround and have a washed out look, especially on sunny days.

Applicant began researching with other mesh materials. To begin with, Applicant sought a flatter mesh material. Applicant discovered 9×9 vinyl coated mesh (VCM) material. This 9×9 vinyl coated mesh (VCM) material is a 1,000D polyester weave that is dipped in a vinyl coating material, and the finished product is a flat mesh screen.

The 9×9 vinyl coated mesh (VCM) material is more airflow restrictive than the 9×9 extruded coated yarn (ECY) material, but allows sufficient airflow to the radiators such that the engine will not overheat (or the other heat exchangers can sufficiently dump their heat). The increased surface area of the vinyl coated mesh (VCM) material allowed for a larger ink footprint which greatly increased the vibrancy of the printed colors and solved the washout problems with chrome vehicle grilles. The vinyl coated mesh (VCM) material extended the use-life the "waste ink collector," but still did not solve it.

Applicant sought to plug the holes on the back-side of the vinyl coated mesh (VCM) material (and print on the front side). This would prevent waste ink from ending up being collected by the "waste ink collector." Applicant experimented with an absorbent pad that Applicant could cut into strips and use double sided sticky tape to hold the pad onto the back side of the vinyl coated mesh (VCM) material. Experimentation with this composite of absorbent pad/double-sided tape/vinyl coated mesh (VCM) material created a fume problem. As the material went through the heated curing process it produced a thin white cloud of smoke that would irritate workers' eyes. The fumes were not necessarily products of just the absorbent pad and/or the double-sided tape. The fumes could also be the products of that brand of vinyl coated mesh (VCM) material.

So applicant experimented first with other suppliers of vinyl coated mesh (VCM) material. Applicant bought most of the vinyl coated mesh (VCM) material applicant would experiment with. A few small samples were provided for free, but the emphasis here is small.

Two sources provided material which did not produce fumes as could be detected by observation, odor, burning eyes, discoloration in the vinyl coated mesh (VCM) material or otherwise. One source did not have the capability of adding a release liner to one side of the vinyl coated mesh (VCM) material.

The other source sent a sample of 12×18 vinyl coated mesh (VCM) material, in a very thin gauge, with a solvent ink release liner for applicant to experiment with, to find if would work in a latex printer.

The problem Applicant ran into was that when the release liner ran through the printer at 240° F. (~115° C.), the release liner would get tacky and the substrate had trouble advancing through the printer. This caused the substrate to "pop up" on each advance, resulting in a head strike and print head damage. Applicant played with the printer settings to try and stop this from happening. Through experimentation, Applicant dialed down both the heat settings to 195° F. (~90 C) and halved the amount of vacuum to get the test substrate to run smoothly through the printer. The manufacturer was willing to work with applicant on their MOQ, and applicant was supplied 200 yards of a 9×9 vinyl coated mesh (VCM) material with release liner for further experimentation.

Several Cycles of Testing and Field Trials

On a latex printer, a higher curing temperature will result in a more durable print. However, the higher the temperature, the more likely the substrate will want to curl from the heat, or in the case of a release liner, become tacky and stick to the print bed. Applicant discovered that adjusting the vacuum pressure for less suction, sufficient suction the substrate essentially flat, but not too high of suction pressure such that the substrate is prevented from feeding smoothly through the printer.

Once Applicant had the 9×9 vinyl coated mesh (VCM) material dialed down on the printer to run through smoothly, Applicant sent out samples for testing to customers.

It was a disaster, the printed image only lasted three weeks installed on the front of a truck. Bugs and road debris sandblasted the image away.

Applicant determined that the temperature had to be higher to cure the ink harder. The final solution to applicant's problem came with running the printer in a hybrid mode of ink collector/normal operation. When an ink collector is installed on the printer, there is also installed what is called a "platen protector." It is a fibrous sheet that covers the bottom heating pad to prevent passthrough ink buildup when using a porous substrate.

With the "platen protector" installed, Applicant could bump the heat back up to the optimal heat curing temperature of 240° F. (115° C.). While the release liner would stick to the stainless steel heating bed, with the fibrous platen protector installed, the liner would run smoothly through without sticking. Further field trials with over-the-road testing on bug screen prototypes using this final method gave applicant the results applicant desired:—a durable and clear printed image on a 9×9 vinyl coated mesh (VCM) material bug screen product that will last for years.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of producing soft bug screens for shielding motor vehicle radiators and affixing graphics thereto; comprising the steps of:
   selecting a flat substrate consisting of flat vinyl coated mesh (VCM) material characterized by spaced broad surfaces, one being an un-lined surface and the other being a lined surface lined with a peel away release liner;
   producing the flat vinyl mesh material from a base of polyester yarn and by a process where the polyester yarn is woven first into a mesh and then the uncoated mesh is coated with a coating of polyvinyl chloride, and not in reverse order whereby in which extruded coated yarn is coated first and then woven after the coating process, where as a result the flat vinyl coated mesh (VCM) can be much flatter (level) on both surfaces than with woven extruded coated yarn, which is likely produced by a warp and weft frame or loom process such that the surface is far from planar, as each longitudinal coated thread climbs over then dives under each successive coated lateral thread, and vice versa, hence leaving the surface with a regular pattern of high spots and low spots, and the low spots are further defined by low inside corners flanking each high spot;
   providing the vinyl coated mesh (VCM) material in a bulk uncut sheet in a wide roll;
   providing a wide-format latex printer that uses latex-based inks;
   the wide-format printer being provided with:
      a flat and smooth print bed;
      substrate conveying system for conveying the sheet substrate over the flat and smooth print bed;
      a vacuum system to keep the conveying sheet substrate flat and smooth on the print bed;
      a traveling print head traveling above the print bed and the conveying sheet substrate and adjustable to clear the conveying sheet substrate by just a few millimeters of clearance;
      a waste ink collection system and a waste ink collector;
      a stainless steel heating bed over which the conveying and recently printed sheet substrate is conveyed across for a heated curing process; and
      a platen protector comprising a fibrous sheet that covers the stainless steel heating bed and which the recently printed conveying sheet substrate transits over to prevent passthrough ink buildup in case of using a porous substrate, whereby that is not the case here;
   conveying the sheet vinyl coated mesh (VCM) material through the wide format printer with the release liner broad surface transiting across the fibrous platen protector and the un-lined mesh surface transiting traveling print head;
   supplying a light vacuum suction to the release-liner lined broad surface of the conveying sheet vinyl coated mesh (VCM) material not only tending to smooth the sheet flat but also by passing the release-liner lined broad surface over the fibrous platen protector, while not performing the designed role therefor because the release liner plugs the holes in the mesh and thus catches the waste ink in the holes, performs an alternative role of allowing the release-liner lined broad surface to pass without suctioning the sheet substrate to immobility;

applying ink on the transiting-past unlined broad surface of the vinyl coated mesh (VCM) material while continuing to supply a light vacuum suction to the release-liner lined broad surface of the vinyl coated mesh (VCM) material;

drying the ink on the continuing transiting unlined broad surface of the vinyl coated mesh (VCM) material while continuing to supply a light vacuum suction to the release-liner lined broad surface of the vinyl coated mesh (VCM) material;

concurrently or one before the other these steps of trimming to final outline and peeling off the release liner; and forming into a finished article comprising a motor-vehicle soft bug screen for shielding any of a radiator, grille, or other heat exchangers like transmission fluid cooler or air conditioning condenser from bug contamination while allowing an airflow therethrough.

2. The method of claim 1, wherein:

the vinyl coated mesh (VCM) material consists of hole sizes that are square and regular, as well as longitudinal and lateral lattice courses that are straight and perpendicular to each other.

3. The method of claim 2, wherein:

the vinyl coated mesh (VCM) material consists is characterized by a Denier number ("D," the linear mass density of fibers, in grams of nine-thousand meters (nine kilometers) of the fiber) of 1000D and an aperture pattern of a 9×9 unit in inches (nine holes in a longitudinal dimension by nine holes in a lateral dimension, eighty-one holes in a square inch, and in a face-centered packing pattern).

* * * * *